United States Patent [19]
Diamond et al.

[11] 3,843,778
[45] Oct. 22, 1974

[54] ANTACIDS
[75] Inventors: Julius Diamond, Lafayette Hill; Robert S. Joslin; John D. Buehler, both of Fort Washington, all of Pa.
[73] Assignee: William H. Rorer, Inc., Fort Washington, Pa.
[22] Filed: Dec. 26, 1972
[21] Appl. No.: 318,580

Related U.S. Application Data
[63] Continuation-in-part of Ser. No. 32,730, April 28, 1970, abandoned.

[52] U.S. Cl.................. 424/38, 424/31, 424/154, 424/155, 424/156, 424/157, 424/319
[51] Int. Cl............................................. A61k 27/00
[58] Field of Search ........... 424/158, 157, 156, 154, 424/38, 31, 23, 319, 155

[56] References Cited
UNITED STATES PATENTS

| | | | |
|---|---|---|---|
| 1,910,684 | 5/1933 | Farrar | 424/158 |
| 1,999,160 | 4/1935 | Walton | 424/158 |
| 3,253,988 | 5/1966 | Scott | 424/157 |
| 3,452,138 | 6/1969 | Granatek et al. | 424/157 |
| 3,629,394 | 12/1971 | Gaunt et al. | 424/38 |
| 3,671,629 | 6/1972 | Levy et al. | 424/38 |

FOREIGN PATENTS OR APPLICATIONS

| | | | |
|---|---|---|---|
| 172,655 | 12/1921 | Great Britain | 424/158 |

Primary Examiner—Frederick E. Waddell

[57] ABSTRACT

A novel process for preparing improved antacid particles is disclosed.

10 Claims, No Drawings

ANTACIDS

CROSS REFERENCE TO RELATED APPLICATIONS

This is a continuation-in-part application of copending Ser. No. 32,730, filed Apr. 28, 1970, now abandoned.

SUMMARY OF THE INVENTION

This invention describes novel antacid particles. This invention describes improved antacid pharmaceutical compositions. This invention describes novel processes for preparing improved antacid pharmaceutical compositions. This invention further describes improved antacid pharmaceutical compositions wherein the taste characteristics thereof are substantially eliminated by oil coating individual particles therein and thereby eliminating the characteristics palatability problem which exists in the art.

BACKGROUND OF THE INVENTION

An ideal antacid pharmaceutical composition has the following general characteristics:

1. Non-systemic; i.e., not absorbed from the GI tract.
2. Ability to raise the pH of the stomach to values in the range of pH 3-4.5.
3. Ability to maintain the desired pH for an adequate length of time.
4. Palatability.
5. Absence of undesirable side effects, such as diarrhea or constipation.
6. Low in cost.
7. Convenience of dosage forms.

A suspension of chewable tablets are the usual and preferred forms for administration.

Many antacids exist which effectively raise the pH of the stomach to the desired values and maintain this pH for an adequate length of time. Other antacids are able to be effective while controlling the undesirable side effects involved. However, these antacids are not ideal since they are unpalatable.

One of the greatest drawbacks with antacid preparations, it is generally agreed, is the characteristic "mouth feel" which is present and is both unpleasant and unpalatable. This is due to the chalkiness, grittiness, dryness and astringent properties associated with metallic carbonates, hydroxides, etc., which serve as basic antacid components. The patient may therefore fail to take his medicine simply because the taste is objectionable to him. It is therefore a paramount importance to patients that their antacid preparation be one not only having significant effectiveness but having favorable palatable properties as well.

Much has been done to try and resolve this problem of antacid palatability since there are many techniques in the pharmaceutical sciences art which can be carried out to transform a disagreeable medication which one having a pleasing taste. salvia such method can be carried out by the careful selection of flavoring agents. Many of the customary techniques of flavoring tablets and suspensions have been attempted in order to overcome this palatability problem of the antacids, however, this problem does not reside in merely masking the unpleasant taste of the metallic carbonates, hydroxides, etc., and the result is that the chalkiness, grittiness, dryness and astringent properties still remain. Overriding or overwhelming flavoring has also been carried out without eliminating all these undesirable properties.

Some antacid agents have such an inherently disagreeable taste that it is difficult to formulate them into a palatable oral product such as a chewable tablet or suspension unless a number of other ingredients have been incorporated therewith. The unpleasant taste may be present in different ways, such as a bitter or a foul or an anesthetic taste.

A further method which has been attempted in the art is to provide a coated tablet which when ingested by the patient will mask the disagreeable taste. The coating, however, must be one which will not dissolve in the saliva but rather at the desired site of action, i.e., the stomach. Coated tablets, however, often result in providing the antacid at the wrong site since they dissolve in the intestine.

The stomach does not remain in a static condition while the antacid is acting on the gastric acid. Periodically the stomach empties itself of its contents, including any unreacted antacid. Moreover, additional acid is being secreted while the acid already in the stomach is being consumed. An effective preparation not only must contain a sufficiently large quantity of antacid per dose, but also must react fast enough to yield all its neutralizing power before it is removed from the site of action by gastric emptying. Coated tablets therefore may have the drawback of limiting the length of time of effectiveness of the antacid since stomach emptying time of the antacid may be relatively soon after dissolution of the coating. This may further hamper the ability of the antacid to raise the pH of the stomach to the desired values.

The most effective antacids generally are in the form of a suspension. It is also for this reason that antacids as tablet preparations should be chewable tablets and not coated tablets since the patient reduces the tablet to small particles and provides his own suspension upon chewing. It is therefore of prime necessity to provide palatability of the chewable tablet as well as maintaining the desired effectiveness of the antacid.

We have unexpectedly found improved antacid preparations.

We have found improved antacid preparations which have the ability to raise the pH of the stomach to the desired values above the range of pH 3.

We have also found improved antacid preparations which have the ability to maintain the desired pH for an adequate length of time.

We have further found these improved antacid preparations to have an absence of undesirable side effects such as diarrhea or constipation.

We have also found these improved antacid preparations to be low in cost and in convenient dosage forms.

We have most importantly found that the antacid preparations of this invention are unexpectedly palatable and substantially free of the "mouth feel" properties associated with known antacid preparations.

We have further found a novel and convenient process for the method of preparing these antacid preparations.

We have found that when antacid particles are coated with a water insoluble, inert, non-toxic hydrocarbon oil, capable of forming a coating thereon, and these coated particles are then formulated into desired suspensions or tablets, an improved antacid preparation results which is substantially free of the impalatable "mouth feel" properties associated with antacids.

We have found that these antacid preparations which contain oil coated particles therein have all the general characteristics associated with an ideal antacid.

We have found that medicinal preparations of the antacid type can be rendered substantially tasteless by oil coating particles of the antacid prior to formulation.

We have found that oil coating of antacid particles cannot be carried out by mere mixing, admixing, combining, triturating or the like of an oil with antacid particles. Rather the oil must be applied to the particles in such a way that the oil will adhere to the particle surface and form oil coated particles. It is for this reason that coating particles in the conventional way as one would coat tablets, pellets or the like cannot be practicably carried out.

Haley in U.S. Pat. No. 1,384,460 discloses a mineral oil emulsion with aqueous milk of magnesia. The amount of oil therein is at least one-third by volume of the final emulsion and preferable 50 percent by volume thereof. Haley teaches the use of mineral-oil emulsions for constipation and he combines aqueous milk of magnesia to the mineral-oil to give consistency to the emulsion in order to form a cream-like remedy. Even though Haley teaches a preparation which contains aqueous milk of magnesia and an oil in combination, he does not teach the art oil coated antacids. It can in fact be regarded that Haley actually coats the mineral oil with the aqueous milk of magnesia in order to form his cream-like preparation.

DESCRIPTION OF THE INVENTION AND THE PREFERRED EMBODIMENTS

The present invention describes improved antacid preparations wherein the problem that has existed in the art relating to the undesirable palatability associated therewith has been overcome. This invention is based on the discovery of unique antacid particles. These antacid particles are novel since they no longer have the inherent "mouth feel" properties associated with the antacid materials.

According to the present invention, a significant improvement in the taste characteristics of oral antacid preparations of the type known as chewable tablets and suspensions results by coating unpalatable antacid particles with an oil.

The oil used must be one which is non-toxic and substantially water insoluble. It must also be inert to the associated ingredients in the preparation as well as the oral fluids. It must further be a substance which is capable of forming such a coating on antacid particles and be bound thereon tightly enough so that it is not released in the mouth. The oil may form a coating which may be monomolecular of polymolecular in thickness. The coating material can range in concentration from about 1:50 to about 1:1,000 by weight of oil to antacid. It is desirable to have the coating enveloping the whole of the antacid particle. Preferably a substantially tasteless oil should be used, however, this is not necessarily essential since the amount of oil present is relatively minute and flavoring excepients may be added to mask any taste of the oil.

Such coating materials which may be used may be taken from any of a class of substantially water insoluble, inert, non-toxic hydrocarbon oils and hydrocarbon oil derivatives. More specifically, the oil may be any oil or oleaginous material of vegetable or mineral origin. Preferably it is one selected from the group consisting of:

almond oil,
coconut oil,
corn oil,
cottonseed oil,
refined linseed oil,
light liquid petrolatum,
heavy liquid petrolatum,
olein,
olive oil,
palm oil,
peanut oil,
persic oil,
sesame oil,
soybean oil, or
safflower oil.

Preferred oils include corn oil, light and heavy liquid petrolatum, olein, olive oil, peanut oil and soybean oil. The more preferred oils are corn oil and light and heavy liquid petrolatum.

The antacid materials which may be oil coated may be one or a combination of those compounds normally considered to be antacids. The size of the antacid particles to be used in this invention would normally fall within the range of 0.05–300 microns, and the preferred size is 1–50 microns. Preferable antacids which may be used in the practice of this invention include:

aluminum hydroxide,
aluminum hydroxycarbonate,
aluminum magnesium glycinate,
calcium carbonate,
dihydroxy aluminum aminoacetate,
magnesium aluminate,
magnesium carbonate,
magnesium hydroxide,
magnesium oxide and
magnesium trisilicate.

Preferred antacids include aluminum hydroxide, calcium carbonate, magnesium carbonate, magnesium hydroxide and magnesium trisilicate. The more preferred antacids include aluminum hydroxide, calcium carbonate and magnesium hydroxide.

Application of the oil coating on the antacid particles may be carried out by various methods and may be made of any of the antacid particles so listed when such antacid raw material exists in the dry form or suspended or dispersed in a liquid (preferably aqueous).

One such method is by spray coating. The oil is dissolved in a solvent medium (preferably a non-polar, non-aqueous, volatile solvent for fatty materials). This is then sprayed onto the antacid particles which are in the form of a dry gel using an appropriate spray coating apparatus. The solvent is concurrently removed by evaporation at the desired temperature until all the solvent has been removed. The result is an oil coated dried gel which may then be used to formulate an antacid composition. The amount of oil coating for a particular bath may be varied depending on the initial amount of oil added to the solvent.

A further process involves the use of the electropositive charge of the antacid particles. An electronegative system is dispersed in the desired amount of oil which is then intimately contacted with a wet antacid gel. The system is then agitated vigorously until homogeneous dispersion of all the materials results. The electronegative medium dispersed in the oil, together with the oil itself, is attracted to the electropositive antacid particles dispersed in the aqueous phase and effectively coats the antacid particles. This composition may then be used directly to formulate antacid suspension compositions or may be evaporated to a dry gel and used to formulate tablets. Suitable electronegative agents which may be used to form this electronegative system include such a surfactant selected from an alkyl aryl sulfonate, or an alkyl sulfate, or sulfonated amides or amines, or sulfated or sulfonated esters or ethers, or an alkyl sulfonate, or a dioctyl sulfosuccinate and the like, or a hydrated aluminum silicate such as micronized bentonite or kaolin, or Cab-O-Sil (which is silica pigment sold under the trademark of Cab-O-Sil by Cabot Corporation of Boston, Mass.), Quso (which is a microfine silica sold under the trademark Quso by Philadelphia Quartz Co. of Philadelphia, Pa.), and the like.

After application of a coating method to the antacid particles, these coated antacid particles are substantially tasteless and can be formulated in a variety of conventional oral preparations for chewable tablets and suspensions depending on the particular preparation desired. These preparations may be prepared according to any method known to the art for the manufacture of pharmaceutical preparations and may contain one or more pharmaceutically acceptable agents, for example, sweetening agents, coloring agents, preserving agents, flavoring agents, etc. Further, the oil coated antacid agent may be formulated alone or in admixture with other antacid or oil coated antacid agents. They may also be formulated with other active ingredients and/or non-toxic pharmaceutically acceptable disintegrating agents, binding agents and the like.

A feature of the present invention is the discovery that formulation with these oil coated antacid particles results in an oil coating bound to the antacid particles tightly enough so that they are not released in the mouth and consequently do not have a bad taste. In gastric juice solution, however, the antacid agent is promptly and fully released so that it can exert its therapeutic effect.

The method of application of this invention is illustrated in the following examples to demonstrate more clearly the embodiments of this invention. They are not intended as limitations thereof.

Example 1

| | |
|---|---|
| Aluminum hydroxide dry gel | 99.5% |
| Methylene chloride | q.s. |
| Light liquid petrolatum | 0.5% |

The light liquid petrolatum dissolved in the methylene chloride is sprayed onto the aluminum hydroxide dry gel using a Patterson-Kelley Liquid Solids Processor. The solvent is concurrently removed by evaporation until all of the methylene chloride has been removed to obtain aluminum hydroxide gel coated with light liquid petrolatum.

When the aluminum hydroxide dry gel in the above example is replaced by one or more of the antacids of Table I below then the corresponding antacid coated with light liquid petrolatum is prepared.

Table I aluminum hydroxycarbonate
aluminum magnesium glycinate
calcium carbonate
dihydroxy aluminum aminoacetate
magnesium aluminate
magnesium carbonate
magnesium hydroxide
magnesium oxide
magnesium trisilicate When the light liquid petrolatum in the above example is replaced by the oils of Table II below then aluminum hydroxide coated with the corresponding oil is prepared.

Table II almond oil
coconut oil
corn oil
cottonseed oil
refined linseed oil
light liquid petrolatum
heavy liquid petrolatum
olein oil
olive oil
palm oil
peanut oil
persic oil
sesame oil
safflower oil When aluminum hydroxide dry gel in the above example is replaced by one or more of the antacids of Table I above and the light liquid petrolatum in the above example is replaced by one of the oils of Table II above then the corresponding antacid coated with the corresponding oil is prepared.

When the amount of oil in the above example is varied between 0.1 and 2 percent with respect to the weight of the antacid present, then the corresponding coating is obtained.

Example 2

The resulting coated dried gel of Example 1 is dispersed in an aqueous vehicle with the addition of the adjuncts as noted below to provide a stable, palatable suspension of the final composition.

| | |
|---|---|
| Coated aluminum hydroxide | 5.0% |
| Sorbitol solution 70% | 2.0% |
| Peppermint oil | 0.004% |
| Saccharin | 0.0225% |
| Methyl p-hydroxybenzoate | 0.1% |
| Propyl p-hydroxybenzoate | 0.05% |
| Distilled water | q.s. |

When coated aluminum hydroxide of the above example is replaced by one or more of the coated antacids of Example 1, then the correspnding suspension is prepared.

Example 3

| | |
|---|---|
| Coated aluminum hydroxide dry gel | 50% |
| Manitol granules | 30% |
| Sorbitol powder | 18% |
| Peppermint oil | 0.01% |
| Magnesium stearate | 1.75% |
| Saccharin | 0.024% |

The coated aluminum hydroxide dry gel of Example 1 is granulated with a 10 percent starch paste, and the other ingredients are blended to produce a tablet granulation suitable for compression into chewable tablets.

When coated aluminum hydroxide dry gel of the above example is replaced by one or more of the coated antacids of Example 1, then the correspnding chewable tablet is prepared.

Example 4

| | |
|---|---|
| Aluminum hydroxide wet gel with 9.0% to 10.5% $Al_2O_3$ content | 25% |
| Magnesium hydroxide wet gel | 25% |
| The microfine precipitated silica sold under the trademark Quso by Philadelphia Quartz Co. of Philadelphia, Pa. | 0.001% |
| Corn oil | 0.15% |
| Sorbitol powder | 25% |
| Mannitol granules | 12.5% |
| A microcyrstalline cellulose sold under the trademark Avicel by FMC Corp. of Marcus Hook, Pa. | 12.34% |
| Peppermint oil | 0.01% |

The aluminum and magnesium hydroxide wet gels are dispersed in a minimum quantity of water. The Quso and dioctyl sodium sulfosuccinate are dispersed in the corn oil. This corn oil dispersion is added to the antacids while agitating vigorously. The resultant slurry is spray dried to produce a corn oil-coated dried gel, which is then compressed into tablets after the addition of the above listed excipients.

When the aluminum hydroxide wet gel and magnesium hydroxide wet gel of the above example is replaced by one or more of the antacids of Table I, Example 1, then the corresponding coated antacid is prepared which may then be compressed into corresponding tablets.

When corn oil in the above example is replaced with the oils of Table II, Example 1, then the corresponding coated antacid is prepared which may then be compressed into corresponding tablets.

Example 5

| | |
|---|---|
| Aluminum hydroxide wet gel | 5% |
| Magnesium trisilicate | 5% |
| Light liquid petrolatum | 1.0% |
| The silica pigment sold under the trademark Cab-O-Sil by Cabot Corp., of Boston, Mass. | 0.001% |
| Sorbitol 70% | 1.1% |
| Saccharin | 0.0225% |
| Methyl p-hydroxybenzoate | 0.1% |
| Propyl p-hydroxybenzoate | 0.05% |
| Glycerol | 2.0% |
| Imitation vanilla flavor | 0.075% |
| Distilled water | q.s. |

The aluminum hydroxide wet gel is dispersed in a minimum quantity of water. The Cab-O-Sil is dispersed in the light liquid petrolatum. This dispersion of Cab-O-Sil in light liquid petrolatum is added to the aluminum hydroxide wet gel while agitating vigorously. The magnesium trisilicate coated with light liquid petrolatum as described in Example 1 is then dispersed in the aqueous medium, and the other components are added to produce a smooth, stable, palatable suspension.

When the aluminum hydroxide wet gel of the above example is replaced by one or more of the antacids of Table I, Example 1, then the corresponding coated antacid is prepared.

When light liquid petrolatum in the above example is replaced by the oils of Table II, Example 1, then the corresponding coated antacids are prepared.

When the above coated antacids are replaced by the coated antacids of Table I, Example 1, then the corresponding suspensions are prepared.

Example 6

| | |
|---|---|
| Aluminum hydroxide wet gel | 25% |
| Magnesium hydroxide wet gel | 15% |
| Calcium carbonate | 3% |
| Corn oil | 1% |
| The microfine precipitated silica sold under the trademark Quso by Philadelphia Quartz Co. of Philadelphia, Pa. | 0.001% |
| Dioctyl sodium sulfosuccinate | 0.001% |
| Sorbitol | 3.0% |
| Saccharin | 0.0225% |
| Methyl p-hydroxybenzoate | 0.1% |
| Propyl p-hydroxybenzoate | 0.05% |
| Glycerol | 2% |
| Imitation vanilla flavor | 0.075% |
| Distilled water | q.s. |

The aluminum hydroxide, magnesium hydroxide and calcium carbonate are dispersed in a minimum quantity of water. The Quso and dioctyl sodium sulfosuccinate are dispersed in the corn oil. This corn oil dispersion is added to the antacids while agitating vigorously. The other compounds are added to produce a smooth, stable, palatable suspension with the desired taste characteristics.

When the aluminum hydroxide wet gel, magnesium hydroxide wet gel and calcium carbonate in the above example are replaced by one or more of the antacids of Table I, Example 1, then the corresponding coated antacid preparation is obtained.

When corn oil in the above example is replaced by the oils of Table II, Example I, then the corresponding coated antacids are obtained.

Example 7

The following ingredients are combined and dispersed in an aqueous vehicle with the addition of the noted adjuncts to form a suspension.

| | |
|---|---|
| Aluminum hydroxide wet gel coated with 0.5% corn oil | 8% |
| Magnesium hydroxide wet gel | 4% |
| Calcium carbonate coated with 0.5% light liquid petrolatum | 2.5% |
| Sorbitol solution, U.S.P. | .5% |
| Mannitol, U.S.P. | .1% |
| Cherry flavor | .03% |
| Saccharin | .05% |

Example 8

When Cab-O-Sil or Quso are replaced in the foregoing examples with equivalent amounts of micronized bentonite or kaolin then the corresponding product results.

We claim:

1. A process for preparing improved antacid particles wherein the wet antacid material is selected from the group consisting of
   aluminum hydroxide,
   aluminum hydroxycarbonate,
   aluminum magnesium glycinate,
   calcium carbonate,
   dihydroxy aluminum aminoacetate,
   magnesium aluminate,
   magnesium carbonate,
   magnesium hydroxide,
   magnesium oxide and
   magnesium trisilicate
said antacid particles having a size between 0.5–300 microns and being coated thereon with a non-toxic, inert, substantially water-insoluble oil coating, said oil being selected from the group consisting of
   almond oil,
   coconut oil,
   corn oil,
   cottonseed oil,
   refined linseed oil,
   light liquid petrolatum,
   heavy liquid petrolatum,
   olein,
   olive oil,
   palm oil,
   peanut oil,
   persic oil,
   sesame oil,
   soybean oil and
   safflower oil;
the proportion of oil coating on said antacid particles being between 1:50 and 1:1000 by weight of oil to wet antacid; the process of which comprises dispersing an electronegatively charged powder selected from the group consisting of
   an alkyl aryl sulfonate,
   an alkyl sulfate,
   a sulfonated amide or amine,
   a sulfated or sulfonated ester or ether,
   an alkyl sulfonate,
   a dioctyl sulfosuccinate,
   a hydrated aluminum silicate,
   a silica pigment and
   a microfine silica
in said oil in an amount sufficient to charge the oil dispersion, intimately contacting the said dispersion with said wet antacid and agitating vigorously to obtain a homogeneous mixture of all the materials present.

2. The process of claim 1 wherein the improved antacid particles are further suspended into a pharmaceutical suspension containing additional pharmaceutically accepted excipients.

3. The process of claim 1 wherein the improved antacid particles are further blended with additional pharmaceutically acceptable excipients and compressed into pharmaceutical tablets.

4. The process of claim 1 wherein the electronegatively charged powder is a silica powder and the antacid particle size is substantially between 1–50 microns.

5. The process of claim 4 where the antacid is selected from the group consisting of
   aluminum hydroxide,
   calcium carbonate and
   magnesium hydroxide; and
the oil is selected from the group consisting of
   corn oil,
   light liquid petrolatum,
   heavy liquid petrolatum,
   olein,
   olive oil,
   peanut oil and
   soybean oil.

6. The process of claim 5 where the oil is corn oil.

7. The process of claim 5 where the oil is light liquid petrolatum.

8. The process of claim 5 where the oil is heavy liquid petrolatum.

9. The process of claim 7 wherein the improved antacid particles are further suspended into a pharmaceutical suspension containing additional pharmaceutically accepted excipients.

10. The process of claim 7 wherein the improved antacid particles are further blended with additional pharmaceutically acceptable excipients and compressed into pharmaceutical tablets.

* * * * *